United States Patent
Linglin et al.

(10) Patent No.: US 7,441,466 B2
(45) Date of Patent: Oct. 28, 2008

(54) WEIGHT SENSOR

(75) Inventors: Benoit Linglin, Cruseilles (FR); Didier Anthoine-Milhomme, Albens (FR)

(73) Assignee: SEB S.A., Ecully (FR)

( * ) Notice: Subject to any disclaimer, the term of this patent is extended or adjusted under 35 U.S.C. 154(b) by 34 days.

(21) Appl. No.: 10/591,650

(22) PCT Filed: Feb. 28, 2005

(86) PCT No.: PCT/FR2005/000474

§ 371 (c)(1),
(2), (4) Date: Sep. 5, 2006

(87) PCT Pub. No.: WO2005/095903

PCT Pub. Date: Oct. 13, 2005

(65) Prior Publication Data

US 2007/0186662 A1    Aug. 16, 2007

(30) Foreign Application Priority Data

Mar. 3, 2004    (FR) .................................. 04 02195

(51) Int. Cl.
*G01N 3/08*    (2006.01)
(52) U.S. Cl. ..................................................... 73/818
(58) Field of Classification Search .................. 73/818, 73/862.61–862.69
See application file for complete search history.

(56) References Cited

U.S. PATENT DOCUMENTS

| | | | |
|---|---|---|---|
| 3,913,391 A * | 10/1975 | Kurtz | 73/776 |
| 4,009,608 A * | 3/1977 | Ormond | 177/211 |
| 4,454,770 A * | 6/1984 | Kistler | 73/862.633 |
| 4,511,877 A | 4/1985 | Nishikawa et al. | |
| 4,793,189 A * | 12/1988 | Dell'Orto et al. | 73/775 |
| 5,847,329 A | 12/1998 | Pitaud et al. | |
| 6,071,627 A * | 6/2000 | Yasuda et al. | 428/610 |
| 7,185,893 B2 * | 3/2007 | Wampula et al. | 277/317 |
| 2005/0085393 A1 * | 4/2005 | Nakao et al. | 505/100 |

FOREIGN PATENT DOCUMENTS

EP    0 789 234 A1    8/1997

* cited by examiner

*Primary Examiner*—Max Noori
(74) *Attorney, Agent, or Firm*—Browdy and Neimark, P.L.L.C.

(57) ABSTRACT

The invention relates to a weight sensor comprising strain gauges which are deposited in thick films on a support (2). The support is made from an electrically-insulating material which is intended to be applied to a metallic body (1) that is essentially subject to bending. According to the invention, the support (2) comprises a ceramic material which has a Young's modulus $E_2$ that is equal to or less than that $E_1$ of the biased metallic body (1) and which is applied to the latter by means of gluing.

18 Claims, 2 Drawing Sheets

WEIGHT SENSOR

The present invention relates to a weight sensor, more particularly of the type using resistance strain gauges to detect deformations of a metal bar. Such a sensor advantageously can be used in an appliance of the bathroom scale, baby scale or kitchen scale type.

A weighing appliance, such as a bathroom scale, includes a plate whose upper surface is intended to receive the weight to be weighed and one or more sensors on the one hand supporting the plate and on the other hand being supported on a base or the feet of the appliance. The sensor or sensors have extensometer gauges connected to an electronic circuit adapted to convert the deformations experienced by the gauges into electric signals and to transform the latter into numerical values corresponding to the measured weight, which is then displayed by the appliance.

A strain gauge sensor is known from the document FR 2 587 484 where the gauges and their connections are deposited on a support made in the form of a thin plate of a ceramic material. The strain gauges are resistances applied by serigraphy to a face of said support, its other face being fixed to the mechanical element whose tensions or deformations are to be detected locally. This type of sensor is known as a thick film technology sensor. The fixing of the support on the deformable element can be effected by using screws or rivets, or even with the help of a layer of adhesive, the deformations of the deformable element being transmitted to the strain gauge through its support. Such a support with strain gauges is easy to manufacture and apply to the deformable part, but it has been found that the type of fixing and the type of material of the support influence in great measure the measuring accuracy of the sensor.

The document FR 2 734 050 in the name of the applicant describes a weight sensor applied to a weighing appliance. The sensor is flat and has a flexure bar on which a ceramic support is adhered. In the applications of the applicant, the extensometer gauges and their connections are disposed by serigraphy on an alumina support. The support is then added by adhering it to the bar of the sensor, generally made of steel. Such a mode of realization of the sensor is easy to implement, but it presents the disadvantage of using a support that, while being a good electrical insulator, has mechanical properties that strongly attenuate the electric signals provided by the circuits of the gauges.

Another strain gauge sensor of thick film technology used to measure a torque is described in the document WO 99/22210. A resistive paste and conducting paths are applied with the help of an electrically insulating layer to a steel support constituting the mechanically deformable element. The electrically insulating layer is a paste based on a sintered glass which is applied initially to the deformable support by a pressing technique, the strain gauges as well as their connections being then applied by serigraphy to said insulating layer. The assembly thus prepared is fired at a temperature of around 750° to 900° C. and the insulating layer is sintered with the upper surface of the support. This fabrication technique presents several disadvantages, the main one being that one must handle the mechanically deformable part during the operations of depositing strain gauges and their connections, which imposes fabrication and organization of work flow constraints that are not negligible. In addition, considering the very high temperatures of sintering, the metal support material must be selected so that it does not lose its mechanical properties with temperature.

The goal of this invention is to remedy at least partly these disadvantages and to provide a weight sensor having a metal bar comprising strain gauges deposited as a thick film on an insulating support having improved mechanical properties, adapted to provide a stronger signal for the same pressure applied to the sensor.

Another goal of the invention is a weight sensor having a metal body comprising strain gauges deposited as a thick film on an insulating support, easy to handle, being able to be applied to practically any type of metal body, without limitation as regards the type of material of the body and/or to the form and dimensions of the latter, while having an increased sensitivity.

Another goal of the invention is a weight sensor easy to manufacture, adapted for mass production at a lower fabrication cost, while being reliable in operation.

These goals are achieved with a weight sensor with strain gauges deposited in a thick film on a support of an electrically insulating material intended to be applied to a metal body deformable primarily in flexure, by the fact that said support is of a ceramic material having a Young's modulus equal to or lower than that of the deformable metal body and that it is applied by adhering to the latter.

By metal body deformed primarily in flexure, one understands the test body of a weight sensor, of which one of the ends serves for fixation to the case of the appliance and the other receives the load applied to the platform. Such a body is subjected to a main flexure deformation under the effect of the weight to be weighed applied to the platform, parasitic moments, such as torsion moments, also being able to intervene due to the point of application of the weight on the platform located at a distance from the sensor.

By support of an electrically insulating material one understands a plate or a sheet, substantially planar, made of a ceramic material on which one can deposit, for example by serigraphy, the various parts of the resistive circuit of the strain gauges, this support being sufficiently rigid so that it can be gripped and handled, for its transfer onto the mechanically deformable body, without tearing and without undergoing permanent deformations. This makes it possible to carry out the delicate operation of depositing the resistive circuit and firing at high temperature at a distance from the deformable part or body which is, generally, of complex form and of large size added to said support, thus difficult to integrate into an automated fabrication flow. Several supports can thus be treated simultaneously during an automatic deposition for mass production, each support being able to then be disconnected from the others and added by bonding on the metal body of which one wants to measure the stresses or the deformations. Fixing by bonding is particularly advantageous in such a fabrication, the intermediate layer of adhesive, well calibrated, playing the part of transmitter of the strain of the deformed body towards the support of the gauges.

The metal body deformed primarily in flexure can be compared to a beam fixed at one of its ends, the other being subjected to a load whose value is to be determined by the sensor. The amplitude of deformation of such a beam depends on the value of the load applied and its cross-sectional inertia. When a rigid support or plate, less deformable than the body of the beam, is fixed to one of the faces of the beam, the deformations of the assembly have a smaller amplitude. Thus, it was noted during tests carried out in the laboratory, that a steel bar (having a Young's modulus of 210 GPa) covered with an alumina plate (of Young's modulus of 340 GPa) deforms much less than the bar alone, without a plate, subjected to the same load. This has a direct influence on the reduction in the signal perceived by the sensor and, therefore, on the sensitivity of the latter.

However, with a sensor of the invention, it was noted that, for a support or platform with a Young's modulus equal to or lower than that of the metal body of the beam, the calculated slope of the sensor is very close to the real slope measured during tests carried out in the laboratory, such as will be explained hereafter.

Advantageously, said body presents a rectangular cross-section with a thickness less than or equal to 15 mm.

It has been shown during tests carried out in the laboratory that the loss of signal of the sensor increases with the ratio E2/E1 of the Young's moduli of the support and the body and decreases with increase in the inertia of the cross-section of the body. Thus, for a test body of square cross-section of 15 mm×15 mm, the loss of signal compared to a calculated ideal value is very low, but this loss of signal is increased for test bodies of lesser thickness to which is applied a ceramic support having a high Young's modulus.

Usefully, said body is made of steel, a material chosen for its properties of mechanical resistance and elasticity.

According to a first embodiment of the invention, said support is selected from the group comprising a zirconium oxide or yttria or cordierite or steatite ceramic.

A zirconium oxide ceramic presents a Young's modulus of 210 GPa, that is to say approximately 30% less than alumina, which limits the harmful effect on the sensitivity of the sensor. In addition, a zirconium oxide ceramic is less friable than alumina, thus being able to be handled more easily. In addition, the linear dilation coefficient is greater than that of alumina, which limits the stresses in the intermediate layer of adhesive.

Other ceramic materials such as yttria and cordierite have a Young's modulus of approximately 140 GPa and steatite presents a Young's modulus of 120 GPa. By their low value of Young's modulus compared with that of the steel body, these materials, when used as supports for the gauges, make it possible for the latter to provide a real signal, not attenuated, to the electric measurement circuit and this even for test bodies of small cross-section.

Such ceramic material supports can be obtained by sintering in the form of a plate of calibrated thickness, a plate which is then cut out to the desired dimensions.

According to a second embodiment of the invention, said support is made of a ceramic cofired at low temperature.

Such a material can be advantageously a laminated strip of the type 951 Green Tape® by DuPont having a Young's modulus of 152 GPa. Such a ceramic comprises generally around 80% alumina and 20% of sintered glass with an organic binder. Such a ceramic is more particularly adapted for use with test bodies of small cross-section, without degrading the sensitivity of the sensors.

During its use as a support for the gauges, such a ceramic cofired at low temperature can undergo a first stage of firing followed by a second operation during which it is cut or precut to the dimensions of the support on which serigraphy of the conducting and resistive tracks is carried out. This serigraphy is then followed by a firing, before the joining of the support on the test body. In a variant of the invention, the firing of such a cofired ceramic band can be realized at the same time as that of the screen printed paste deposited on said tape.

Usefully, the thickness of said support lies between 0.05 and 0.5 mm.

The electrically insulating support supporting the strain gauges must have the smallest possible thickness in order to better transmit the deformations of the test body, but while being easy to handle at the time of the operations preliminary to its joining to the test body and presenting an effective electric insulation compared to the electric voltages brought into play and with regard to the expected lifetime of the sensors.

Preferably, the weight sensor of the invention includes a test body in the shape of a bar carrying strain gauges, one of the ends of said bar being connected to a fastener, the other end being connected to a load applying element, where the test body flexes according to an S shaped form as a symmetrical double cantilever.

By placing the strain gauges in the zones of the deformable test body mounted as a double cantilever where the radii of curvature due to the double inflection of the beam are smallest, one can thus obtain amplified signals, easier to process thereafter by the electric circuit of the appliance.

Advantageously, the weight sensor of the invention is produced in the form of a metal plate having a fastener in the shape of a framework or U, connected in the middle of its base to a first end of a test body extending at the interior of the fastener, the opposite end of the test body being connected to a load receiving element in the form of a U, extending in a symmetrical manner relative to the body, with the arms parallel to the body and directed towards said first end of the body.

Such a sensor makes it possible to produce a weighing appliance having a thin profile, while being very precise and reliable in operation.

An electronic weighing appliance can have at least one weight sensor of the invention. Advantageously, such an appliance can be furnished with four sensors, in that case with test bodies of reduced cross section, while retaining a good measuring precision.

The invention will be better understood from a study of embodiments taken on a non-limiting basis and illustrated in the annexed figures in which:

FIG. 1a schematically represents a sensor of the state of the art in longitudinal cross section;

FIG. 1b is the cross section of the sensor of FIG. 1a;

Figure 1A:
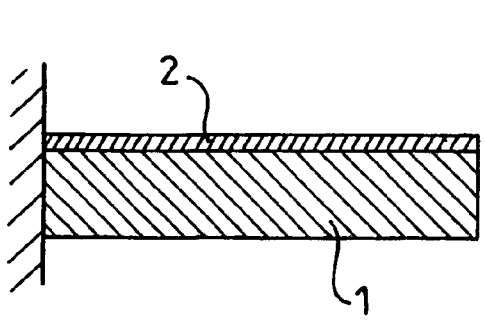
Figure 1B:
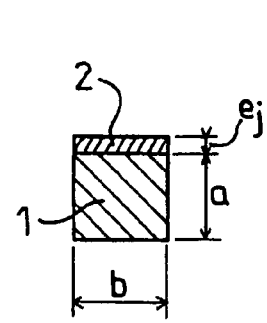
Figure 1C:
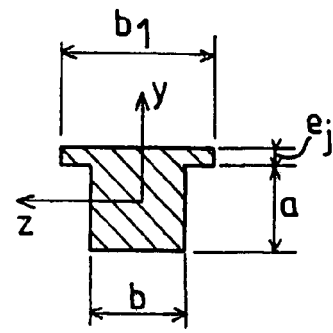
FIG. 1c is the transformed cross section, theoretical, of that represented in FIG. 1b.

A force sensor urged primarily in flexure is represented in FIG. 1a by a compound symmetrical beam held at one of its ends, the load being able to be applied at the free end. This compound beam consists of two different materials: a body 1 of steel and a support 2 of alumina applied to the upper part of body 1. Support 2 is applied by bonding and one can suppose that there is no slippage between support 2 and body 1, in a manner such that one can use the theory of simple beams according to which elongations and contractions of the longitudinal fibers are proportional to the distance which separate them from the neutral axis. In FIG. 1b one notices the rectangular cross-section of body 1 of width b and height h and that of support 2 of width b and thickness $e_j$. In FIG. 1c is represented the transform of the section of FIG. 1b, the modulus of elasticity $E_2$ of alumina being higher than that $E_1$ of steel, which is equivalent, from the point of view of flexure, to a much wider steel core, of width $b_1$ and thickness $e_j$. If it is desired that the moment of resistance to the internal forces remain unchanged for a given curvature, the thickness $b_1$ of the core must be such that $b_1 = b \cdot E_2/E_1$.

Figure 2:
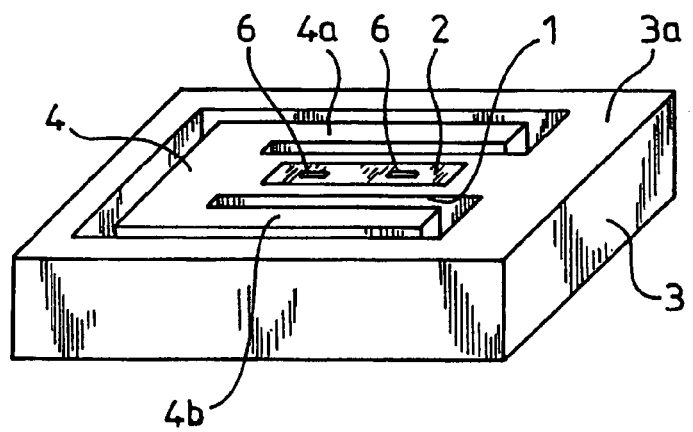
FIG. 2 is a perspective view of an example of realization of a weight sensor using the characteristics of the invention.

FIG. 2 is a perspective view of a weight sensor equipping a bathroom scale as described in the document FR 2 734 050 in the name of the applicant. The sensor has an element 3 for attachment to the weight reception platform of the appliance, more particularly in the form of a framework 3a. The framework 3a is connected by a bar or test body 1 to a load application element 4 in the form of a U. During application of the load on the two opposed arms 4a, 4b parallel to body 1 of element 4, test body 1, mounted in double cantilever, becomes deformed taking a symmetrical S form. A support 2 carrying the strain gauges 6 is applied to body 1 over all or a part of its length so that the deformations of body 1 are transmitted to the strain gauges through support 2. Strain gauges 6 are positioned in the zones of maximum deformation of body 1 in order to confer greater sensitivity to the sensor.

Figure 3:
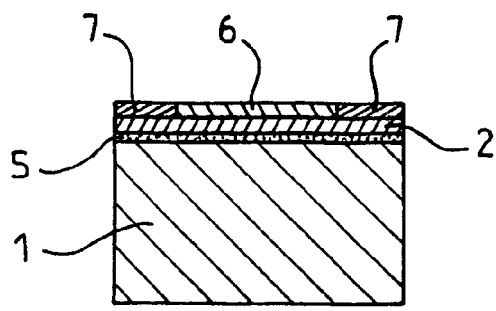
FIG. 3 is a transverse cross-sectional view of the test body of the sensor of FIG. 2.

FIG. 3 illustrates a transverse cross section of body 1 of the sensor of FIG. 2 where support 2 made of a ceramic material is applied via a layer of adhesive 5 to body 1. Strain gauges 6 and conductive paths 7 ensuring their connection to the electric circuit of the appliance were applied beforehand by serigraphy of resistive paste and respectively of conductive paste on support 2.

Within the framework of such a sensor described by way of example, two gauges 6 connected in a half bridge are applied on test body 1. The theoretical or calculated slope of such a sensor is given by the formula:

Theoretical slope=$3 \cdot k \cdot d/2 \cdot E \cdot b \cdot a^2$ where k is the gauge coefficient of resistance which is a function of the type of resistive paste used (equal to 10 in this case);

d is the distance between the centers of the gauges;

E is Young's modulus of body 1 (equal to 210 GPa for a steel body);

b is the width of body 1 and a is the height of body 1.

This theoretical slope corresponds to the ideal behavior of a sensor, it does not take into account the stiffness supplied by support 2.

Figure 4:
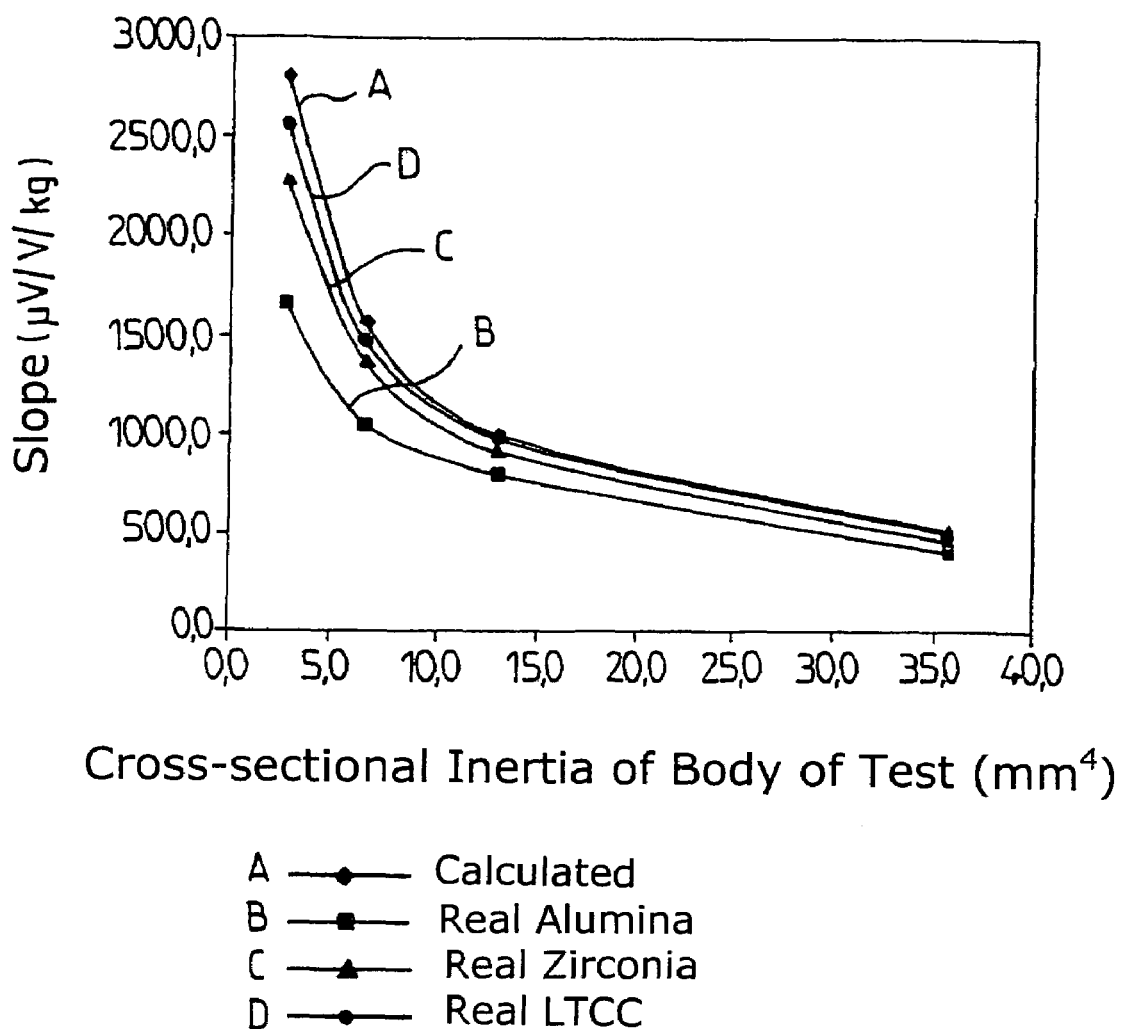
FIG. 4 is a graph illustrating the sensitivity curves of a weight sensor as a function of the cross-sectional inertia of the test body for different materials of the gauge support.

FIG. 4 illustrates by a graphic representation the variation of the slope or the sensitivity of a sensor according to the cross-sectional inertia of its test body. Thus, curve A represents the theoretical slope of a sensor of the type described. The curves B, C and D are representations of the real slopes measured with a sensor of the type described, but by using various materials for its support 2. Curve B is the real curve of a sensor according to the prior art using a support 2 of alumina.

More particularly according to the invention, support 2 is made of a material that presents a Young's modulus equal to or lower than that of body 1, in this case a ceramic cofired at low temperature (called LTCC) or a zirconia ceramic on a body 1 of steel.

Thus, the curve D is the real curve of a sensor according to the invention having a support 2 of ceramic cofired at low temperature or LTCC.

Curve C is the real curve of a sensor according to the invention using a zirconia ceramic as the material of support 2.

It appears clearly from FIG. 4 that the sensitivity of the sensor is largely improved by a judicious choice of the material of the support, in particular its elasticity, and this is all the more visible for test bodies having a low cross-sectional inertia.

By comparing curves A and B of FIG. 4, one notices that the maximum change is obtained for test bodies of small cross-section, whereas for the test bodies having a larger cross-section the variation is very small. Thus, by considering a weight sensor having a support 2 of alumina fixed on a test body of steel of 15 mm×15 mm square cross section, used for example in a bathroom scale with only one sensor, the loss of signal is around 0.13%. From measurements taken with a kitchen balance using the same support of alumina and a rectangular cross section of the test body of steel of 10 mm×3.5 mm, the loss of signal is 20.1%. Whereas the same measurements taken with a kitchen balance with four sensors of which the cross section of the test body also of steel and rectangular is 8 mm×1.2 mm, the gauge support being also of alumina, established a loss of signal of 59.4%.

It is thought to be able to explain the invention in the following way, that is by reconsidering FIG. 1c where the cross-sectional inertias of body 1 alone are:

$I_{zz} = b \cdot a^3 / 12$, and $I_{yy} = a \cdot b^3 / 12$.

Cross-sectional inertias of the new part and by considering the distance from the center of gravity of body 1 to the center of gravity of support 2 approximately equal to half of the width of body 1, or a/2 are:

$I_{zz} = b_1 \cdot e_j^3 / 12 + b_1 e_j \cdot a^2 / 4$, and $I_{yy} = e_j \cdot b_1^3 / 12$.

Consequently, corrected cross-sectional inertias of the compound beam are:

$I_{zz(total)} = ba^3/12 + b_1 \cdot e_j^3/12 + b_1 e_j \cdot a^2/4$, and $I_{yy(total)} = a \cdot b^3/12 + e_j \cdot b_1^3/12$ From the preceding formulas, it would seem that more the Young's modulus $E_2$ of the material of the support is low compared to $E_1$, the smaller is its influence on the cross-sectional inertia of the compound beam. These theoretical considerations are at the origin of the realization of the sensor of the invention.

Thus, with the sensors of the invention using a test body 1 of steel on which is applied by bonding a support 2 of a zirconia ceramic (curve C) or a ceramic cofired at low temperature or LTCC (curve D) one observes on FIG. 4 that the real behavior of the sensor (real slope) conforms to the theoretical curve relating the sensitivity of the sensor to the cross-sectional inertia of the test body. The differences obtained with such supports are very small, and are established, for the curve D with a maximum of 18.2%, and for the curve C with a maximum of 26%, in the most unfavorable case of a test body of reduced cross-section, the dimensions of the latter being 8 mm×1.2 mm.

The manufacture of such a weight sensor is composed of the following steps. A first step consists in obtaining the metal body of the sensor, for example according to the contour shown in FIG. 2, for example by stamping or cutting out of a matrix of a planar metal sheet. In parallel, the sintered ceramic support (this support being a sintered zirconia, yttria, cordierite or steatite ceramic or an already fired LTCC), appearing as a sheet of rather large dimensions, is precut to the dimensions of an individual sensor support. A first serigraphy operation consists of applying the conducting paths by applying a conductive paste, for example silver paste. This serigraphy is followed by a firing to around 850° C. A second serigraphy stage consists of applying a resistive paste, for example a sintered glass with metal particles, on the ceramic support followed by a second firing at 850° C. The precut blanks thus obtained are then cut out and added by bonding on the test body of the sensor. The adhesive is for example an epoxy adhesive cross-linking at 200-250° C. The thickness of the layer of adhesive is well calibrated in order to reduce its shearing when the test body drops back to ambient temperature in order to be able to transmit the strains coming from the test body towards the ceramic support and thus the strain gauges. The calibrated thickness of the layer of adhesive also makes it possible to obtain a good hysteresis and a good return to zero of the sensor.

Other alternatives and embodiments of the weight sensor of the invention can be envisioned without departing from the framework of these claims.

Thus, in one alternative, one can use as an insulating support a laminated strip of a ceramic of the type LTCC on which is carried out a deposition by serigraphy before firing of the ceramic. Then firing at around 850° C. of the support unit and screen printed tracks deposited on said support is carried out. The assembly thus obtained can possibly undergo an additional stage of serigraphy and it is then applied by bonding to the test body.

In another alternative, one can already adhere the unfired LTCC band to the test body and carry out the serigraphy and the firing of the unit thereafter.

The invention claimed is:

1. Weight sensor with strain gauges deposited in a thick film on a support (2) of an electrically insulating material intended to be applied to a metal body (2) deformable primarily in flexure, characterized in that said support (2) is of a ceramic material having a Young's modulus $E_2$ equal to or lower than that $E_1$ of the deformable metal body (1) and that it is applied by adhering to the latter.

2. Weight sensor according to claim 1, characterized in that said body (1) presents a rectangular cross section having a thickness less than or equal to 15 mm.

3. Weight sensor according to claim 1, characterized in that said body (1) is made of steel.

4. Weight sensor according to claim 1, characterized in that said support (2) is selected from the group comprising a zirconia or yttria or cordierite or steatite ceramic.

5. Weight sensor according to claim 1, characterized in that said support (2) is made of a ceramic cofired at low temperature.

6. Weight sensor according to claim 1, characterized in that the thickness of said support (2) is comprised between 0.05 and 0.5 mm.

7. Weight sensor according to claim 1, characterized in that it comprises a body of test (1) in the shape of a bar carrying strain gauges (6), one of the ends of said bar being connected to a fastener (3), the other end being connected to a load applying element (4), where the body of test (1) flexes according to an S shaped form as a symmetrical double cantilever.

8. Weight sensor according to claim 7, characterized in that it is produced in the form of metal plate having a fastener (3) in the shape of a framework (3a) or U, connected in the middle of its base to a first end of a body of test (1) extending at the interior of the fastener (3), the opposite end of the body of test (1) being connected to a load receiving element (4) in the form of a U, extending in a symmetrical manner relative to the body (1), with the arms (4a,4b) parallel to the body (1) and directed towards said first end of the body (1).

9. Electronic weighing appliance having at least one sensor according to claim 1.

10. Electronic weighing appliance having at least one sensor according to claim 2.

11. Electronic weighing appliance having at least one sensor according to claim 3.

12. Electronic weighing appliance having at least one sensor according to claim 4.

13. Electronic weighing appliance having at least one sensor according to claim 5.

14. Electronic weighing appliance having at least one sensor according to claim 6.

15. Electronic weighing appliance having at least one sensor according to claim 7.

16. Electronic weighing appliance having at least one sensor according to claim 8.

17. Weight sensor according to claim 1, wherein said support is a ceramic plate or sheet and said strain gauges are deposited on said ceramic by serigraphy.

18. Weight sensor comprising: a support of an electrically insulating material; strain gauges deposited in a thick film on said support; and a metal body deformable primarily in flexure, wherein: said metal body has a Young's modulus $E_1$, said support is of a ceramic material having a Young's modulus $E_2$, $E_2$ is equal to or lower than that $E_1$, and said support is applied to said metal body by adhering thereto.

* * * * *